United States Patent [19]
Katzakian, Jr. et al.

[11] Patent Number: 5,863,438
[45] Date of Patent: Jan. 26, 1999

[54] PROCESSES FOR DEIONIZATION AND DEMINERALIZATION OF FLUIDS

[75] Inventors: Arthur Katzakian, Jr., Elk Grove; Donald C. McGehee, Carmichael; Charles E. Grix, Sacramento, all of Calif.; Frank A. Brigano, Hoffman Estates, Ill.

[73] Assignee: Culligan International Company, Northbrook, Ill.

[21] Appl. No.: 856,897

[22] Filed: May 15, 1997

Related U.S. Application Data

[62] Division of Ser. No. 585,821, Jan. 16, 1996, Pat. No. 5,665,239.

[51] Int. Cl.$^6$ .................................................. C02F 1/42
[52] U.S. Cl. ............................................ 210/674; 210/685
[58] Field of Search ........................... 210/635, 656, 210/659, 664, 670, 674, 681, 683, 685, 687

[56] References Cited

U.S. PATENT DOCUMENTS

| | | | |
|---|---|---|---|
| 2,884,384 | 4/1959 | Howell et al. | 210/674 |
| 3,536,637 | 10/1970 | Noll et al. | 260/22 |
| 3,905,903 | 9/1975 | David | 210/656 |
| 3,928,192 | 12/1975 | Katzakian, Jr. et al. | 210/674 |
| 3,939,071 | 2/1976 | Katzakian, Jr. et al. | 210/674 |
| 3,941,693 | 3/1976 | DePree | 210/674 |
| 4,028,234 | 6/1977 | Katzakian, Jr. et al. | 210/674 |
| 4,263,147 | 4/1981 | Robinson | 210/685 |
| 4,298,477 | 11/1981 | Cole | 210/674 |
| 4,332,031 | 5/1982 | Barkatt et al. | 376/313 |
| 4,372,858 | 2/1983 | Ritter | 210/264 |
| 4,389,253 | 6/1983 | Nishimura et al. | 134/1 |
| 4,664,811 | 5/1987 | Operhofer | 210/673 |
| 4,705,637 | 11/1987 | Heller et al. | 210/670 |
| 4,729,834 | 3/1988 | Itoh et al. | 210/670 |
| 4,751,189 | 6/1988 | Rocklin | 436/150 |
| 4,764,276 | 8/1988 | Berry et al. | 210/264 |
| 4,808,317 | 2/1989 | Berry et al. | 210/660 |
| 4,820,421 | 4/1989 | Auerswald | 210/670 |
| 5,137,702 | 8/1992 | Yan | 423/229 |
| 5,139,734 | 8/1992 | Corpora et al. | 210/264 |

OTHER PUBLICATIONS

Brochure by Advanced Separation Technologies Incorporated, entilted: *The ISEP Principle of Continous Absorption.* pp. 1–21 (undated).

*Primary Examiner*—Ernest G. Therkorn
*Attorney, Agent, or Firm*—McDermott, Will & Emery

[57] ABSTRACT

Processes for deionization and demineralization of a fluid containing ions comprising:

(a) Loading an amine or ammonia buffer onto a first weakly acidic cation exchange resin to occupy cation exchange sites and to form a first bed comprising a first amine-buffered resin;

(b) Passing said fluid containing ions through said first bed comprising said first amine-buffered resin and exchanging cations of said fluid for amine cations of said first amine-buffered resin to form a first effluent comprising an anion-buffer salt complex;

(c) Passing said anion-buffer salt complex through a first weakly basic anion exchange resin where an anion portion of said anion-buffer salt complex is split from said anion-buffer salt complex by adsorption of said anion portion onto said weakly basic anion exchange resin to form a second effluent comprising buffer in free hydrated base form;

(d) Passing said buffer in free hydrated base form to a second weakly acidic cation exchange resin where said buffer loads onto said second weakly acidic cation exchange resin as in step (a) and repeating the process of steps (b)–(d); and (e) Regenerating said first weakly acidic cation exchange resin with an organic acid.

11 Claims, 5 Drawing Sheets

PROCESSES FOR DEIONIZATION AND DEMINERALIZATION OF FLUIDS

This is a Divisional of U.S. patent application Ser. No. 08/585,821, filed Jan. 16, 1996, now U.S. Pat. No. 5,665, 239.

FIELD OF THE INVENTION

The invention relates to processes for deionization and demineralization of fluids. More particularly, the invention relates to improved processes for deionization and demineralization of fluids using buffered weak acid-weak base ion exchange resins with regeneration of spent resins.

BACKGROUND OF THE INVENTION

Removal of contaminants such as minerals and ions from fluids such as water and waste water is becoming extremely important in preserving water resources. Examples of fluids, which may require removal of minerals and ions include surface, ground and process water and waste water from industrial plants, refineries and waste treatment plants. Ionic and metallic pollution in water destroys the ecological balance and can be a threat to human, animal, fish and plant life.

Water deionization and demineralization processes are well known. Examples of such processes include reverse osmosis, chemical precipitation, ion exchange, and distillation. Examples of processes for weak ion exchange water deionization and demineralization are shown in U.S. Pat. Nos. 3,905,903, 3,928,192, 3,939,071, 3,941,693, and 4,028,234, which are incorporated by reference herein. For example, in U.S. Pat. No. 3,905,903, a process for water demineralization is shown involving use of separate beds of weakly acidic cation exchange resin, weakly basic anion exchange resin, and a third column of weakly acidic cation exchange resin. The first column of cation resin is buffered with a suitable base such as ammonia or an amine. When the saline feed is passed through the system, the cations of the feed are exchanged for the buffer, releasing buffered salts. The buffered salts when passed through the anion exchange column are split, releasing the buffer that is then deposited on the third cation resin column. The latter weakly acidic cation exchange resin is then used as the first bed during the next demineralization cycle.

The present invention comprises improved methods of water deionization and demineralization comprising improved resins, buffers, regeneration and regenerant recovery systems which enable overall improved efficiencies and cost savings over prior art methods. The improved methods of the invention enable the systems of the invention to be utilized in a wide variety of commercial applications. The improvements to water deionization and demineralization processes disclosed herein include an improved overall process comprising regeneration, regenerant recovery and recycle steps enabling recovery and reuse of spent resins and regenerants. Further, the improvements comprise new anion resins, new amine buffers and new regenerants.

SUMMARY OF THE INVENTION

The invention comprises methods for deionization and demineralization of a fluid containing ions comprising:

(a) Loading an amine or ammonia buffer onto a first weakly acidic cation exchange resin to occupy cation exchange sites and to form a first bed comprising a first amine-buffered resin;

(b) Passing said fluid containing ions through said first bed comprising said first amine-buffered resin and exchanging cations of said fluid for amine cations of said first amine-buffered resin to form a first effluent comprising an anion-buffer salt complex;

(c) Passing said anion-buffer salt complex through a first weakly basic anion exchange resin where an anion portion of said anion-buffer salt complex is split from said anion-buffer salt complex by adsorption of said anion portion onto said weakly basic anion exchange resin to form a second effluent comprising buffer in free hydrated base form;

(d) Passing said buffer in free hydrated base form to a second weakly acidic cation exchange resin where said buffer loads onto said second weakly acidic cation exchange resin as in step (a) and repeating the process of steps (b)–(d);

(e) Regenerating said first weakly acidic cation exchange resin with an organic acid to reestablish said first weakly acidic cation exchange resin to hydrogen form and to form a spent organic acid regenerant comprising a mixture of cation salts of the organic acid regenerant and free organic acid regenerant;

(f) Regenerating said first weakly basic anion exchange resin with an organic base to reestablish said first weakly basic anion exchange resin to free hydrated base form and to form a spent organic base regenerant comprising a mixture of anion salts of said organic base regenerant and free organic base regenerant;

(g) Distilling said spent organic base regenerant to remove free organic base regenerant for reuse in step (f);

(h) Combining said anion salts of said organic base regenerant with said spent organic acid regenerant to form a regenerant product solution having an acidic pH comprising an organic acid, an organic acid/organic base complex and neutral inorganic salts;

(i) subjecting said regenerant product solution to evaporation so that water is condensed and collected leaving a concentrated regenerant product solution comprising said organic acid regenerant, residual organic acid/organic base complex and neutral inorganic salts;

(j) Combining said concentrated regenerant product solution with an alcohol selected from the group consisting of methanol, ethanol, and isopropanol causing said neutral inorganic salts to precipitate;

(k) Filtering to remove said neutral inorganic salts precipitated in step (j) and distilling filtrate to remove said alcohol;

(l) Passing alcohol-free filtrate formed in step (k) through a chromatographic column to separate free organic acid from said organic acid/organic base complex;

(m) Passing said organic acid/organic base complex collected in step (l) to a dissociation-distillation column where dissociation of said organic acid/organic base complex yields free organic base and water, which are separated from said organic acid/organic base complex, and collected and reused in step (g); and (n) Returning separated free organic acid from step (l), which contains up to 5% organic acid/organic base complex to step (e).

The invention further comprises processes for deionization and demineralization of a fluid comprising new buffers, anion resins and regenerants. For example, the processes of the invention include processes for deionization and demineralization of a fluid containing ions comprising:

(a) Loading an amine or ammonia buffer onto a first weakly acidic cation exchange resin to occupy cation exchange sites and to form a first bed comprising a first amine-buffered resin;

(b) Passing said fluid containing ions through said first bed comprising said first amine-buffered resin and exchanging cations of said fluid for amine cations of said first amine-buffered resin to form a first effluent comprising an anion-buffer salt complex;

(c) Passing said anion-buffer salt complex through a first weakly basic anion exchange resin where an anion portion of said anion-buffer salt complex is split from said anion-buffer salt complex by adsorption of said anion portion onto said weakly basic anion exchange resin to form a second effluent comprising buffer in free hydrated base form;

(d) Passing said buffer in free hydrated base form to a second weakly acidic cation exchange resin where said buffer loads onto said second weakly acidic cation exchange resin as in step (a) and repeating the process of steps (b)–(d);

(e) Regenerating said first weakly acidic cation exchange resin with an acid to reestablish said first weakly acidic cation exchange resin to hydrogen form; and (f) Regenerating said first weakly basic anion exchange resin with a base to reestablish said first weakly basic anion exchange resin to free hydrated base form;
wherein an improved anion resin is utilized comprising an aliphatic polyamine ion exchange resin having an active site density of at least about 2.5 meq/ml (water swollen bead form), or wherein the amine buffer comprises a hydroxylamine of the formula $HONH_2$ or $R—NH—OH$, where R is selected from $—CH_3$, $—CH_2CH_3$, $—CH_2CH_2CH_3$, $—CH_2CH_2OH$ and $—CH_2CH(OH)CH_2OH$.

The processes of the invention further comprise new regenerants such as glutaric acid and new recycle processes for recovery of regenerants.

BRIEF DESCRIPTION OF THE DRAWINGS

These and other features of the invention will now be described with reference to the drawings of preferred embodiments which are intended to illustrate and not to limit the invention, and in which.

DETAILED DESCRIPTION OF THE INVENTION

The invention comprises processes for removal of ions and minerals from water using separate beds of weakly acidic cation exchange resins and weakly basic anion exchange resins connected in series and an amine or ammonia buffer to optimize exchange efficiencies.

As used herein the following terms have the following meanings:

"Breakthrough" means the appearance of feed material in a resin bed effluent stream.

"Buffer bleed" or "bleed" means buffer that is removed from the buffered cation column, or from the first buffered cation column if a series of cation columns are employed, by hydrolysis rather than by ionic displacement by a cation.

"Free hydrated base" means the buffer or the anion resin in a non-salt form, i.e., a hydrated amine form.

"Free acid" means the cation resin in its $H^+$ form as opposed to being loaded with cation.

"Loading efficiency" means the percentage of the cation resin or anion resin's theoretical loading capacity which is loaded upon said resin when a specific aqueous solution of an ionic salt is passed through the resin.

"pK" is the measure of the completeness of an incomplete chemical reaction. It is defined as the negative logarithm (to the base of 10) of the dissociation constant, K, for the reaction in question. The pK is used to express the extent of dissociation or the strength of weak acids and complex ions or similar species. The weaker an electrolyte, the larger is its pK. Thus, at 25° C. for sulfuric acid, (strong acid), pK is about 1.92, for its second dissociation; acetic acid (weak acid), pK=4.76; boric acid (very weak acid) pK=9.24. In a solution of a weak acid, if the concentration of undissociated acid is equal to the concentration of the anion of the acid, the pK will be equal to the pH.

"Superficial contact time" means the initial resin volume prior to an operational step (i.e., loading, buffering, or regeneration) divided by the average volumetric feed rate through the resin.

The processes of the present invention are useful in removal of inorganic and organic salts from fluids such as water and waste water. The processes of the invention are also useful in removal of total dissolved solids from such fluids in amounts of from between about 500 ppm to about 30,000 ppm. Such inorganic salts may comprise halides, sulfates, sulfites, phosphates, phosphites, carbonates, bicarbonates, nitrates and nitrites and organic salts such as carboxylates, phosphonates and sulfonates of such metals as K, Na, Ca, Ba, Mg, Sn, Fe, Cu, Zn, Al, V, Cr, Mn and other cations. Excellent results are obtained with Group IA and IIA alkali and alkaline earth metals, the most naturally occurring impurities in water. The processes of the present invention are also useful in removal of anions and cations from a saline feedstock.

Figure 1:
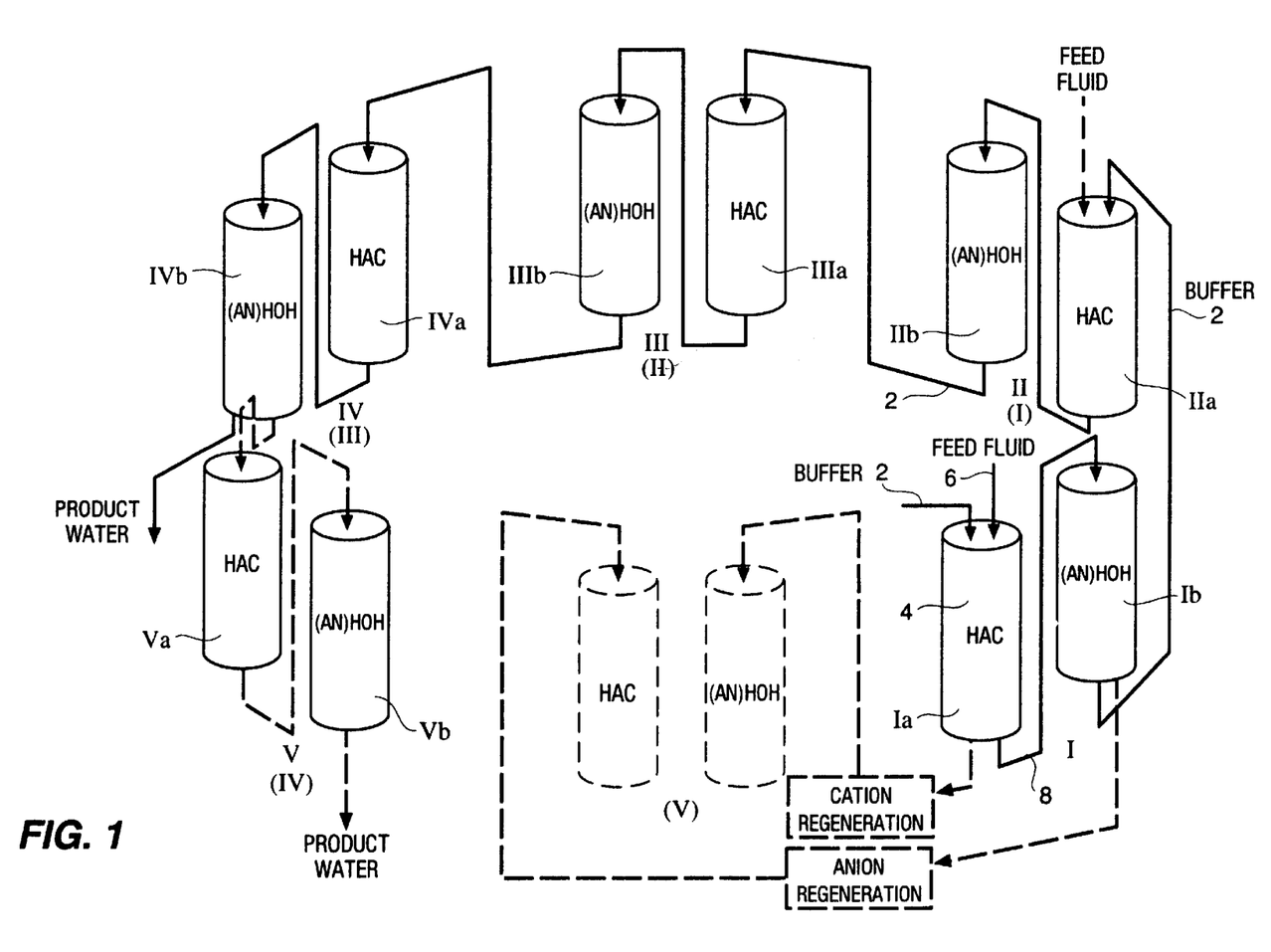
FIG. 1 is a schematic view of the deionization and demineralization process of the invention.

As shown in FIG. 1, in the processes of the invention, first a weakly acidic cation exchange resin Ia is loaded with an amine or ammonia buffer 2 to occupy cation exchange sites and form a first bed of an amine-buffered resin 4. Next, a feedstock fluid 6 containing ions is passed through the first amine-buffered resin 4 exchanging cations in the fluid 6 for amine cations and forming an effluent 8 comprising an anion-buffer salt complex. The anion-buffer salt complex of the effluent 8 is then passed through a bed of weakly basic anion resin Ib, in hydrated amine form, where an anion portion of the anion-buffer salt complex is split from the buffer 2 by adsorbing onto the weakly basic anion resin Ib to form an effluent comprising buffer 2 in free hydrated base form. The free buffer 2 is then passed through a second weakly acidic cation exchange resin IIa where the buffer 2 loads onto a second weakly acidic cation resin IIa as in the first step, and the process begins anew.

More specifically, a plurality of weakly acidic cation exchange resins, Ia, IIa, IIIa, IVa and Va and weakly basic anion exchange resins Ib, IIb, IIIb, IVb and Vb are alternated in a carousel arrangement in series using a paired arrangement, suitably at least 3 pairs, usually 4, with a fifth set as a spare. Initially, the first weakly acidic cation exchange resin Ia in pair I is loaded with a buffer 2, to form a first bed comprising a first amine-buffered resin 4. Next, the feed fluid 6 is passed through the first amine-buffered resin 4, with cations from the feed fluid displacing the buffer 2 and forming an effluent 8 comprising an anion-buffer salt complex. Some buffer bleed may occur primarily to the lead weakly acidic cation exchange resin IIa in pair II with a slight bleed to the lead weakly acidic cation exchange resin IIIa in pair III, and only a trace bleed to the lead weakly acidic cation exchange resin IVa in pair IV. For high quality water it is important that sufficient column pairs be used so that there is no bleed from the last pair when loading of the first pair is completed. This criterion establishes an optimum or maximum permissible loading on the first pair.

After both columns in pair I are loaded and the buffer is exhausted from the first weakly acidic cation exchange resin Ia and all buffer has washed past the first pair, these columns are removed for regeneration and the columns in pair II become the lead part of columns and the spare columns become the end columns. The columns in pair I after regeneration are placed in the position at the end of the "carousel."

Figure 2:
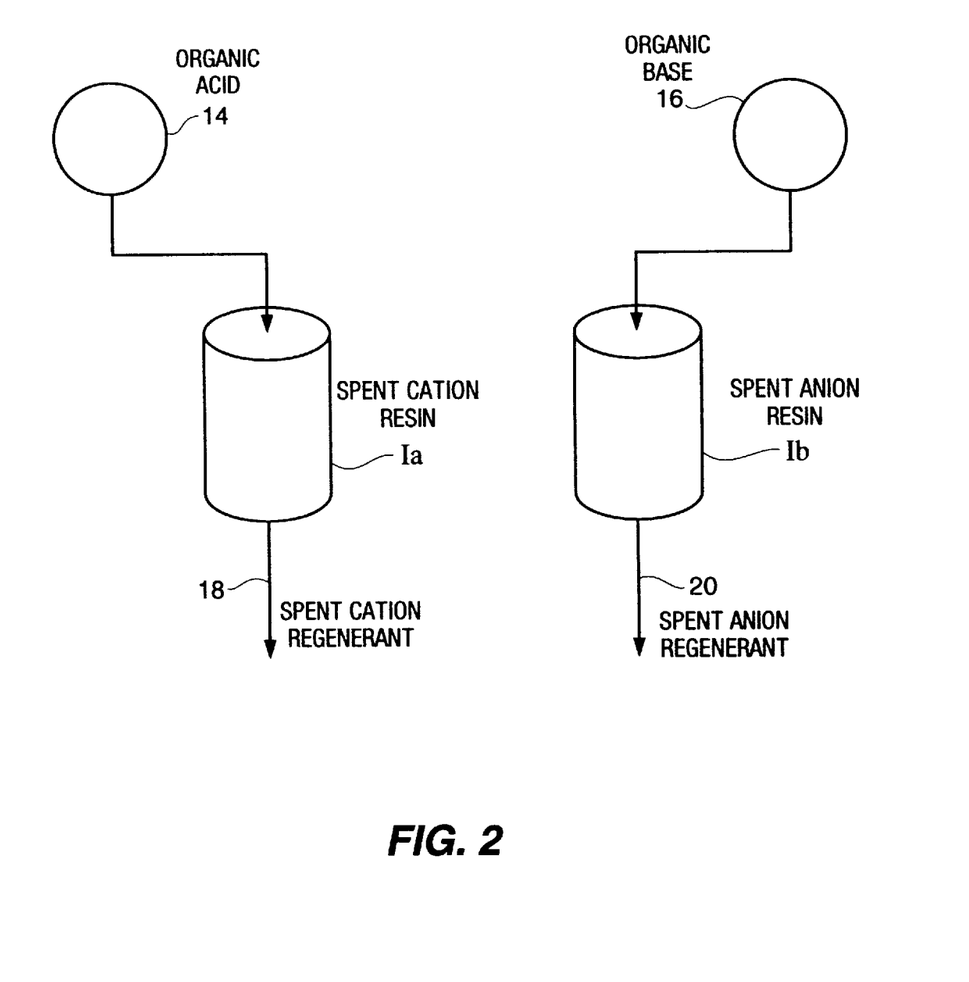
FIG. 2 is a schematic view of a resin regeneration and spent regenerant collection system of the invention.
Figure 3:
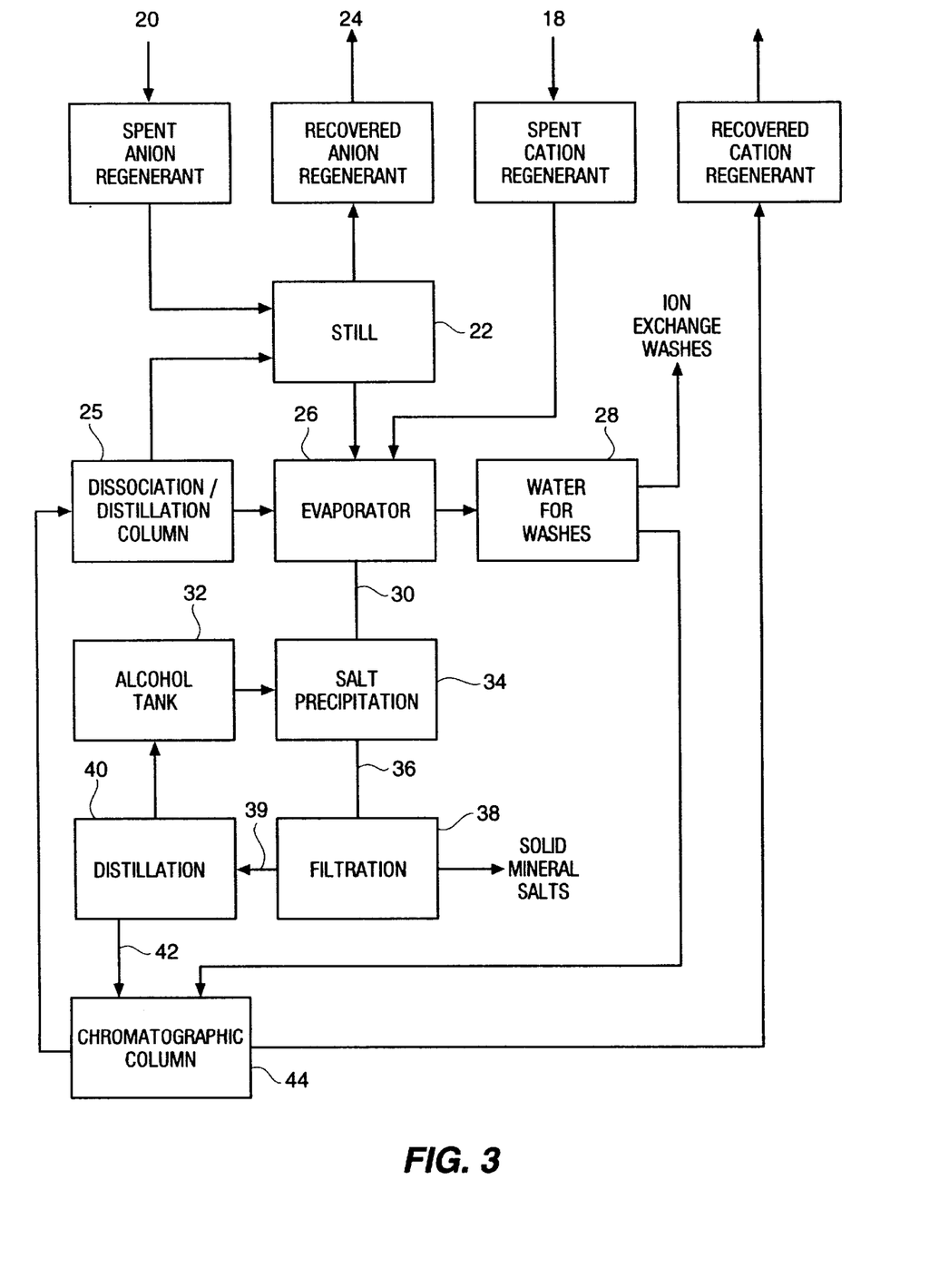
FIG. 3 is a schematic view of a spent regenerant recovery system which utilizes the regenerant recovery process of this invention.

As shown in FIG. 2, the first spent weakly acidic cation exchange resin Ia is regenerated with an organic acid 14 to reestablish the weakly acidic cation exchange resin Ia to hydrogen form. The spent weakly basic anion exchange resin Ib is regenerated with an organic base 16 to reestablish the anion exchange resin Ib to free hydrated base form. Next, the resultant spent regenerants (cation and anion) 18, 20 are individually fed to the regenerant recovery system as shown in FIG. 3.

In the recovery system (FIG. 3), the spent anion regenerant 20 is fed to a still 22 where the free amine and some of the water is evaporated and recovered as reconstituted anion regenerant solution 24. The remainder of the water and all of the dissolved amine-salt are discharged with the spent cation regenerant 18 to an evaporator 26 where excess water is recovered for washes 28, leaving a concentrated regenerant product solution 30 comprising organic acid regenerant, residual organic acid/organic base complex and neutral inorganic salts. The concentrated regenerant product solution 30 is then combined with an alcohol from alcohol tank 32 such as methanol, ethanol or isopropanol causing the neutral inorganic salts to precipitate in precipitation step 34. The resulting solution 36 is then filtered in filtration step 38 to remove the precipitated neutral inorganic salts, and the resulting filtrate 39 is distilled to remove alcohol in distillation step 40. The alcohol-free filtrate 42 containing free organic acid (cation regenerant) and the organic acid/organic base complex is then passed through a chromatographic column 44 (FIG. 3) which separates up to 40% of the free organic acid from the mixture of free organic acid and organic acid/organic base complex. The undissociated organic acid/organic base complex and remaining free organic acid are then recycled to the dissociation/distillation column 25 and then to the evaporator 26. The free organic acid is collected from the chromatographic column 44 and reused in regeneration of spent weakly acidic cation exchange resins.

RESINS

The pK of both cationic and anionic resins which are useful in the methods of the invention should fall between about 5 and about 9. The resins are used in particulate bead form and may be in the size range of about 1.2 to about 0.3 mm (16–50 U.S. mesh).

Weakly Acidic Cation Exchange Resins

The weakly acidic cation exchange resins which are useful in the methods of the invention comprise those having carboxylic acid groups. Examples of weakly acidic cation exchange resins are disclosed in U.S. Pat. No. 3,928,192, incorporated by reference herein. These resins can be obtained by the copolymerization of compounds such as acrylic acid, methacrylic acid, acrylic esters, methacrylic esters, acrylonitrile or methacrylonitrile, and other unsaturated acrylates or nitrites with appropriate cross-linking agents such as divinylbenzene.

If the resins are formed from the polymerization of compounds containing ester or nitrile groups, hydrolysis to the corresponding acid must be effected prior to buffer addition. Further examples of the resins useful in the practice of the invention and of methods for their preparation may be found by reference to U.S. Pat. Nos. 2,340,111, 2,371,818, 2,597,437, 2,885,771, and 2,963,453.

In addition to the above-mentioned resins, other weakly acidic cation exchange resins may be used. These resins may include those containing phosphonous, phosphonic, phosphinic or phosphoric acid groups and those resins which are made from phenol-formaldehyde condensates which also contain carboxylic acid groups.

The weakly acidic cation exchange resins preferred are those which contain either acrylic or methacrylic acid functional groups. Representative weakly acidic cation exchange resins are Amberlite® IRC-50 (a carboxylic resin based on a methacrylic acid cross-linked copolymer) having a pK of about 6.1, Chelex-100 (a very weakly acidic, iminodiacetic acid polystyrene type) having a pK of about 6.0 to 7.0, Amberlite® IRC-86 (a gel-type polyacrylic acid bead type resin having a pK of about 5.0–5.5) of Rohm & Haas Company, Philadelphia, Pa. ("IRC-86"), and Ionac® CC (a macroporous weakly acidic cation exchange resin based on a very rugged acrylic/divinylbenzene copolymer) of Sybron Chemicals, Inc., Birmingham, N.J. IRC-86 is most preferred due to its high loading efficiency and capacity. The preferred superficial contact time for loading the cation resins with a feed fluid (buffer loading or feed fluid for deionization/demineralization) is about 23 min.

Weakly Basic Anion Exchange Resins

Buffers such as tris(hydroxymethyl)aminomethane ("Tris") and triethanolamine ("TEA") have been shown to load onto polyacrylic resins with a low tendency to hydrolyze (bleed) off the resin due to interaction with water. Without being limited to any particular theory, applicants believe that this property is attributed to the presence in these buffers of primary hydroxyl groups that are two carbon atoms removed from the amine functional group in the molecule. These alcohols (hydroxyls) effectively make the amines weaker bases, which should increase the tendency of the molecule to hydrolyze off the weakly acidic cation resin in the presence of water. Since this does not happen, the hydroxyl groups contribute some additional function. While this class of buffers yields optimal loading on the weakly acidic cation exchange resins, previously they have not been able to be used in weak acid/weak base deionization and demineralization processes because the hydrochloride buffer salt would not split efficiently on the weakly basic anion exchange resins and produce free amine buffer to rebuffer the succeeding cation resin column.

We have found that the use of aliphatic polyamine ion exchange resins with an active site density of at least about 2.5 meq/ml (water swollen bead form) will enable the use of Tris and other optimal hydroxylamine buffers or mixtures thereof for loading on the weakly acidic cation exchange resins, while further enabling efficient splitting of the buffer-salt on the weakly basic anion exchange resins.

The improved weakly basic anion exchange resins of the invention are generally resins having primary, secondary or tertiary amine groups as the principal functional group. Examples of weakly basic anion resins are disclosed in U.S. Pat. No. 3,928,192, incorporated by reference herein. Typically, the weakly basic anion exchange resins are copolymers of acrylonitrile and methylacrylate cross-linked with divinylbenzene and then subjected to aminolysis with polyamines, copolymers of styrene-divinylbenzene chloromethylates treated with primary or secondary amines, and reaction products of phenolformaldehyde with a polyalkyleneamine. A weakly basic anion exchange resin may be defined as one which on titration with hydrochloric acid in water free from electrolytes has a pH below 7 when the amount of hydrochloric acid added is one-half the amount required to reach the inflection point (equivalence point).

The weakly basic anion exchange resins used in the processes of the invention with Tris and other polyhydroxyethylamine buffers have a pK range of about 5.5–7.5 and are high capacity resins having an active site density of about 2.5 meq/ml of resin and higher (measured capacity). The high capacity resins appear to enable improved splitting of hydrochloride salt on loading weakly basic anion resins. Ionac® A-365 (tertiary amine active groups, crosslinked acrylic matrix, gel type, 3.5 meq/ml active site density, measured capacity) of Sybron Corporation, Birmingham, N.J. ("A-365") and Purolites® A-830 (a high capacity macroporous anion exchange resin with an acrylic matrix and with functional groups of the polyamine type, 2.7–3.3 meq/ml active site density, measured capacity) of The Purolite Company, Bala Cynwyd, Pa. ("A-830"), are both preferred anion resins useful in the methods of the invention, with A-830 being most preferred.

As discussed below, a Tris buffer has been known to be an excellent buffer with regard to loading on the weakly acidic cation exchange resin in the process of the invention and offers the possibility of utilizing up to about 80% of the active resin sites for sodium ion displacement. Such utilization would double the cation loading capacity and reduce the regenerant recovery cost. However, a usable weakly basic anion resin which could effectively split the buffer-salt formed in the sodium exchange had not been found previously.

With prior art anion resins such as IRA-68, buffer bleed began at the start of the run. This is undesirable since the useful exchange capacity of the resin is reduced, and containment of the buffer within a minimum number of cation/anion resin pairs is severely compromised.

It has been found that when using a weakly basic anion exchange resin in water swollen form having an active site density of at least about 2.5 meq/ml such as A-830 or A-365 in the methods of the invention, effective splitting of the "Tris" amine-acid-salt occurs. As the test data show in FIG. 4, at a flux rate of 2.24 cc/sq cm-min., bleed of buffer hydrochloride does not occur until >11% (A-365) or >24% (A-830) of theoretical loading of chloride ion has taken place. At a flux rate of 1.02 cc/sq cm min., bleed of buffer hydrochloride does not occur until >17% (A-365) or >30% (A-830) of theoretical loading of chloride ion has taken place. At this point, bleed of buffer hydrochloride is slight and increases slowly throughout the run. Bleed rate only increases rapidly when loading of chloride ion has reached near the maximum loading that can be achieved with this system. By contrast a prior art anion resin IRA-68 permitted a large percentage of buffer hydrochloride to bleed throughout the whole loading process.

Figure 4:
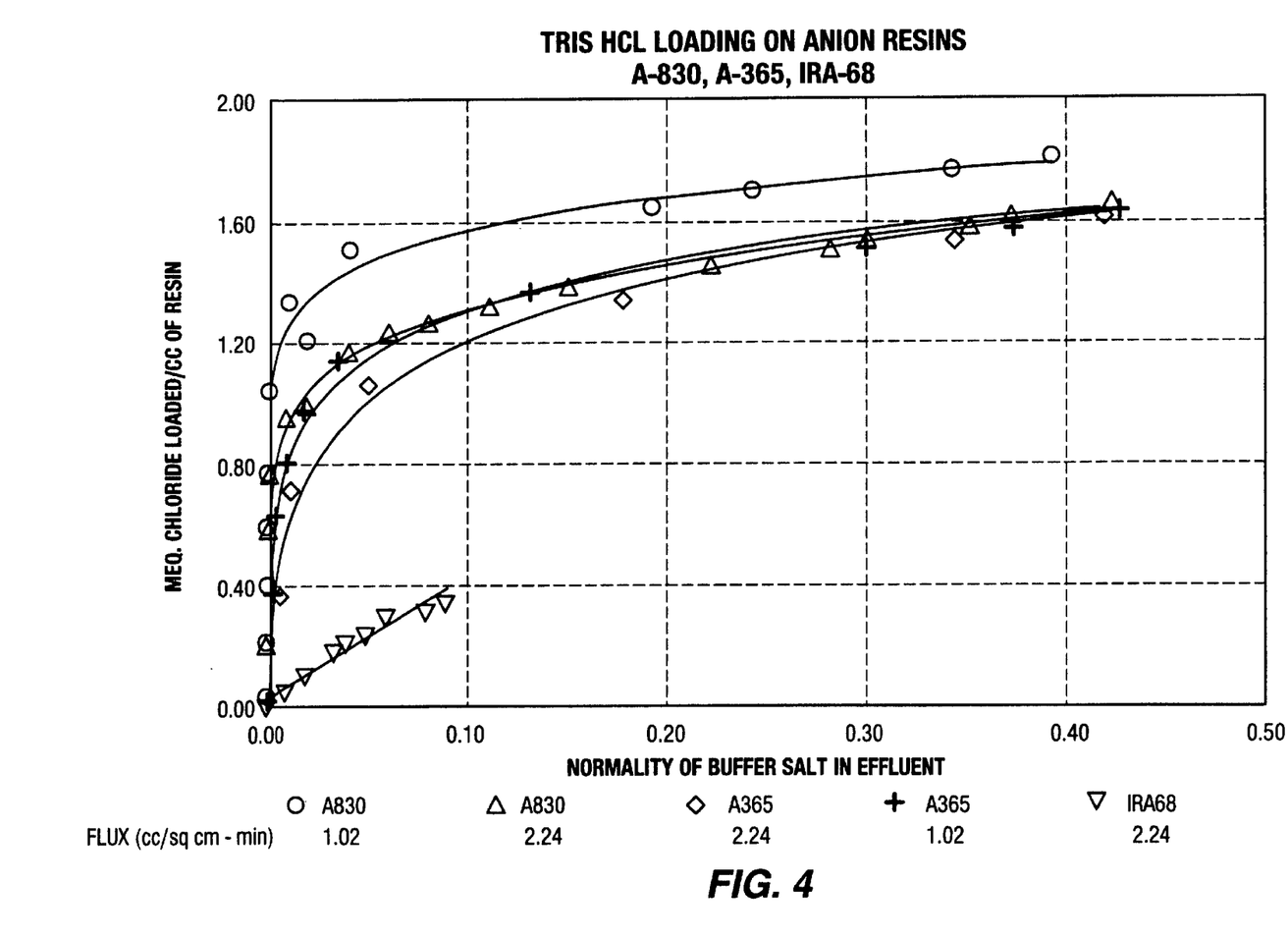
FIG. 4 shows a comparison on a resin volume basis of two anion resins of the invention versus an anion resin of the prior art.
Figure 5:
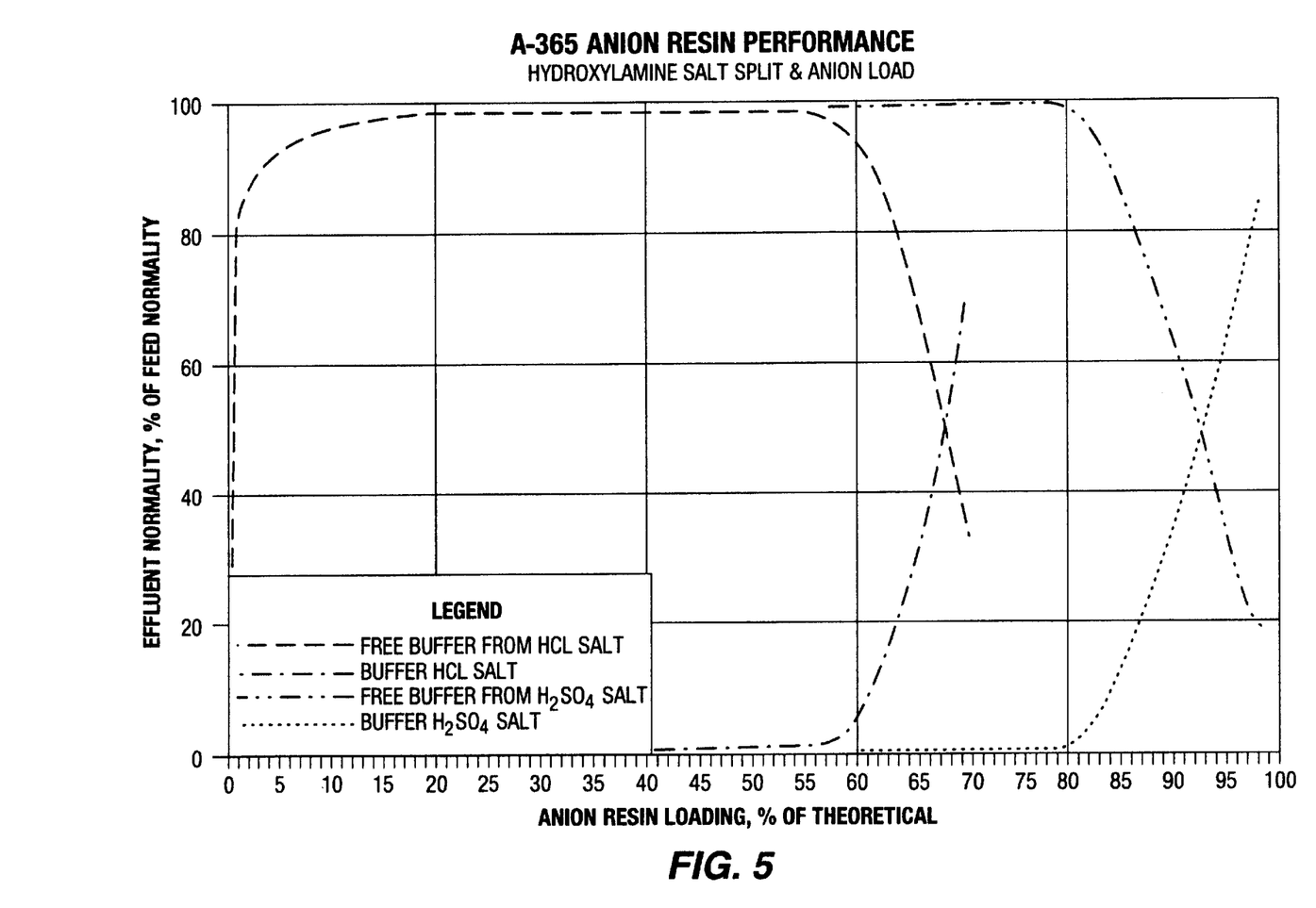
FIG. 5 shows data on chloride and sulfate loading using buffer systems and anion resins of the invention.

The comparisons presented in FIG. 4 are on a resin volume basis. The distinct advantage of using an anion resin having an active site density of at least about 2.5 meq/ml such as A-830 and A-365 basic anion resins with the "Tris" buffer over the other resins is shown by the fact that much higher volumetric loadings are achieved before significant buffer HCl begins to show in the effluent. As an example, at the point where the buffer salt concentration measured 0.002N as a bleed in the effluent, the loading of A-830 is about 1.0 g-eq/1000 cc of resin and A-365 is about 0.7 g-eq/1000 cc of resin versus approximately 0.4 g-eq/1000 cc of resin loading for a prior art resin, IRA-68. It can also be seen from FIG. 5 that "Tris-$H_2SO_4$" salts load even better than the "Tris-HCl" when using an anion resin (A-365) of the invention.

The results of experimentally loading the Amberlite IRC-86 cation resin with the "Tris" buffer demonstrated that 2.7 meq/ml of resin can be buffer (65% of theoretical capacity) without significant buffer bleed. The maximum buffer loading appears to be 72% of theoretical capacity.

The vertically mounted ion resin exchange columns used for the "Tris-salt" splitting on A-830 and A-365 anion resins were 25 mm inside diameter by 750 mm long. The column with end fittings is supplied by Andrews Glass Company, Vineland, N.J. However, other resin columns may be used in the methods of the invention, and it may be optimal to use even larger volume columns or containers for the resins.

The columns were loaded with 290 cc to 310 cc (300 cc average) of "as received" A-830 or A-365 resin to a bed depth of approximately 610 mm (24 inches) or to about 81% of the column height. The bed was conditioned by loading the resin with a feed of 1N HCl followed by a deionized water wash, followed by a regeneration of the resin with 1N NaOH, followed by another deionized water wash to an effluent pH of <8. The anion loading test feed rate (top-down) targets were either 5 or 11 cc/min. Ammonia solution (1N) was used for regeneration after most of the resin loadings. The feed pumps used were Masterflex variable speed peristaltic, model 7520-10 with 7518-10 quick change pump head. Effluent volumes were collected in appropriately sized graduated cylinders during a timed interval. Effluent analysis was determined using a Metrohm Potentiograph Titrimeter, model E436 with either standardized 1N NaOH or HCl reagent. Analysis during resin conditioning demonstrated a bed theoretical capacity of 1 gram equivalent.

The resin loading rate of about 5 or 11 cc/min, for a flux rate of about 1.02 or 2.24 cc/sq cm-min. (0.25 or 0.55 gal/sq ft-min.), respectively, is believed to be at the lower end of the useful range. It is further believed that performance appears to be sensitive to feed rate or contact time. It has been found that the preferred embodiment of the processes of the invention comprise between about three to about five column sets at fluxes of below about 2.24 cc/sq cm-min. (0.55 gal/sq ft-min.). The most preferred processes of the invention use as few column sets as possible, preferably three. The preferred superficial contact time for loading the anion resins with anion-buffer salt complex is about 26 to about 52 min.

BUFFERS

In the methods of the invention, the buffer provides the mechanism whereby neutral salts can be effectively loaded on high capacity weak resins. Successful buffers for the processes of the invention must satisfy three basic conditions. First, the buffers must efficiently load onto the weakly acidic (hydrogen form) cation resin. The greater the percentage of theoretical resin active sites loaded with buffer, the better the possible cation loading when salt solution is subsequently fed to the resin.

Second, when the feed fluid containing ions such as an inorganic salt solution is fed to the buffered cation resin, the buffer must be exchanged for the cation in the feed fluid with as little bleed (hydrolysis) of free buffer as possible and with as great a quantitative exchange or displacement as possible before "breakthrough" of the ions in the feed fluid stream. The earlier the ion or inorganic salt breakthrough, the greater the number of resin column sets required both to retain the buffer within the resin column system and to maintain a high quality deionized water output product.

Third, the conjugate formed between the buffer that is displaced from the weakly acidic cation resin and the inorganic anion of the feed salt that was split, must itself be split on the weakly basic anion resin and the inorganic anion species loaded efficiently before breakthrough.

This requires that the buffer have a low dissociation constant (high pK of about 5 to about 8). However, with prior art buffers, the lower the dissociation constant, the greater the tendency of the buffer to hydrolyze off the resin as water flowed through it.

Buffers for use in such a process have been disclosed in U.S. Pat. Nos. 3,928,192 and 4,028,234, the disclosures of which are incorporated by reference herein. Such buffers include those selected from the family of polyhydroxyethylamine buffers such as Tris, TEA and hydroxyethylmorpholine.

In the processes of the invention, new buffers have been discovered that have demonstrated increased performance over the prior art buffers listed above. The new buffers include a hydroxylamine buffer of the formula $HONH_2$ or R—NH—OH, where R is selected from —$CH_3$, —$CH_2CH_3$, —$CH_2CH_2CH_3$, —$CH_2CH_2OH$ and —$CH_2CH(OH)CH_2OH$, and a mixed buffer of the above hydroxylamine buffer and Tris. Preferably, the mixed buffer used in the process is an approximately 50:50 mixture of the above hydroxylamine buffer and Tris.

Results of studies of the hydroxylamine buffer alone and a mixture of Tris and hydroxylamine buffer were tested and are set forth below. Hydroxylamine buffers have a low dissociation constant, approximately $10^{-8}$, yet still hydrolyze off weakly acidic cation resins at a much lower rate than normal amines having 10 times the dissociation constant. Further, the hydroxylamine buffers have been found to cause the weakly acidic cation resin to swell only about one-third as much as the best prior art buffers, which caused swelling of 60–90%. Additionally, in the strong acid form, the hydroxylamine buffer salts split very efficiently on the weakly basic anion resins of the invention. Greater than 70% loading has been measured before any salt breaks through the column. Test results using hydroxylamine buffers in the methods of the invention follow.

The hydroxylamine buffer tested was available as a free base ($HONH_2$) from Sachem Chemical, Austin, Tex., and as a hydrochloride salt ($HONH_2 \cdot HCl$), from Aldrich Chemical, Milwaukee, Wis. The salt was made up to a 0.03N solution and fed onto an A-365 weakly basic anion resin bed to test the salt splitting efficiency and to produce free amine for cation loading test work.

Prior to use, the A-365 resin was regenerated with 2.0N ammonia solution and washed with deionized water to an effluent pH of <8. The splitting test used a feed rate of 12 cc/min. The experimental data for the hydroxylamine hydrochloride salt splitting showed the anion loading on the A-365 resin reached 2.1 g-eq/liter of resin before the buffer salt bleed reached a concentration of 0.002N. This is an outstanding 60% anion loading before significant bleed of the feed salt.

Data were also obtained on the splitting efficiency of hydroxylamine sulfate using the same procedure, since sulfate is even more common in natural waters than chloride. These data showed an anion resin loading of about 80% before "breakthrough" and about 98% loading by "exhaustion". The results of both the chloride and sulfate loadings are presented in FIG. 5.

The effluent from the A-365 salt splitting test produced the free hydroxylamine at 0.03N for the IRC-86 resin loading test. It was determined that cation loading of buffer will exceed about 55% of theoretical resin capacity with no bleed of free buffer until about 52% of the loading is reached. The loading was terminated at this point because the buffer feed was beginning to be contaminated with buffer salt from "breakthrough" on the anion column. The column swelling was observed to be only 6.1% at this high buffer loading (38 mm out of 622 mm), which was both very unexpected and desirable.

A resin loading with 0.05N calcium chloride feed was also conducted and showed, as expected, much better performance than with sodium chloride. A calcium loading of 29% of the resin theoretical capacity was achieved before salt "breakthrough".

Another preferred buffer is a mixture of hydroxylamine and Tris buffer. Preferably, the combination is an approximately 50:50 blend of "Tris" and hydroxylamine which produces a mixture with a pK of about 7.0. Mixed buffers useful in the methods of the invention are discussed below.

The blended buffer of 50:50 hydroxylamine ($HONH_2$) and Tris was loaded on an IRC-86 cation resin by feeding a 0.0293N concentration at a flux of about 2.24 cc/sq cm-min, top-down. No buffer bleed or breakthrough was observed until about 75% of theoretical resin capacity was attained. Loading was continued after breakthrough and nearly 80% buffer loading was rapidly reached by the time the effluent concentration of buffer had reached about 60% of the feed concentration. This buffer loading of about 75% of resin capacity before breakthrough was the best performance of any single buffer tested for buffer loading.

Next, a 0.0308N sodium chloride solution was metered at 16.6 cc/min or a flux of 3.38 cc/sq cm-min to the mixed buffer loaded cation resin column (IRC-86). The results demonstrate that between about 45 to about 60% of the anion resin capacity may be utilized before the anion column would have to be taken out of service. Salt breakthrough occurred at a resin loading of about 40% of theoretical capacity. This phase of the resin loading was accompanied by a decreasing bleed of free amine which appeared to be principally hydroxylamine. At "NaCl breakthrough," a total of about 13.7% of the originally loaded buffer had bled as free buffer, and buffer bleed from this point was detectable but negligible at less than 0.0002N concentration. Continued salt feed to the column, indicated that exhaustion (total buffer removal) occurred at twice the "breakthrough" effluent volume flow with a total sodium loading of about 50% of the theoretical cation resin capacity.

The performance of the splitting of buffer-hydrochloride salt of the A-365 anion resin was next examined, using a 50:50 buffer salt feed at 0.0312N concentration and a flux of 2.24 cc/sq cm-min. The splitting efficiency and anion loading appears to be better than that of "Tris-hydrochloride" feed alone, but not as good as hydroxylamine-hydrochloride by itself. Taken as a whole (buffer loading, buffer displacement, and buffer salt splitting), the mixed buffer, preferably an approximately 50:50 blend of Tris and hydroxylamine, appeared to offer an improved total system performance over any single buffer system.

REGENERANT ACID

In the deionization and demineralization process of the invention, a thermal step is used to recover cation and anion regenerants for reuse. Therefore, the organic acids and bases selected for regeneration of spent cation and anion resins must have chemical and thermal stability.

Organic Acid Cation Regenerants

Suitable organic acid cation regenerants for use in the processes of the invention should satisfy at least the following requirements. First, the organic acid cation regenerants should form soluble mineral salts such as calcium and magnesium salts whose solubilities increase rather than decrease with increasing temperature. Second, they should not be volatile at water distillation temperature (aliphatic monocarboxylic acids that are water soluble either boil or form azeotropes that boil at or below the boiling point of water). Third, they should have low enough dissociation constants ($\sim 10^{-5}$) to permit significant dissociation when combined with the organic base anion regenerant to be used in the processes of the invention.

Further, the salts of the organic acids used as cation regenerants in the processes of the invention should have high solubility in the presence of high concentrations of mineral salts such as $Na^+$, $Ca^{++}$ and $Mg^{++}$ salts of $Cl^-$, $SO_4^{--}$, and $NO_3^-$. At least at the temperatures used for dissociation (>about 125° C.) and organic base anion regenerant distillation, the organic acid salts must have greater solubility than the neutral salts so that only the neutral salts that exceed their individual solubility products precipitate, leaving the free organic acid and any remaining organic base anion regenerant as the salt in solution. This concentrate will be cooled and fed to a precipitation vessel, where with the addition of an alcohol such as methanol, ethanol or isopropanol, the mineral salts will be precipitated. The resulting slurry will be filtered and washed with alcohol to remove the occluded organic acids and bases from the mineral salts and produce an alcohol-rich filtrate. The precipitate will then be washed with a small amount of salt-saturated water such as NaCl to remove residual alcohol from the precipitate. The filtrate from this salt-saturated water wash is then combined with the alcohol-rich filtrate to be distilled to remove and recover alcohol for continued use in the mineral salt precipitation. The "bottoms" from this distillation will be charged to a silica column to obtain a fore cut of "clean" organic acid which can be immediately used for the next cation resin regeneration. The "tail" cut from the silica column and the washings that follow will be distilled removing water and organic base, formed as the organic base-organic acid complex is partially dissociated. The overhead dilute organic base will be returned to the spent organic base distillation step for recovery, and the "bottoms" solution, rich in organic acid and non-dissociated organic base-organic acid complex, will be recycled as the "heel" to the evaporation step. The isolated granular salts precipitated in the alcohol precipitation step are discarded or purified for use elsewhere.

The organic acid regenerants should be able to completely regenerate polycarboxylic acid resins that are in the alkali or alkaline earth salt forms even when the organic acid regenerant solution contains about 4% dissolved mineral salt such as sodium chloride.

Preferably, the organic acid cation regenerant comprises glutaric acid or a glutaric acid derivative such as an alkyl-substituted glutaric acid, which meets all of the above requirements with significant advantages over prior art cation regenerants. For example, glutaric acid is more stable than prior art cation regenerants such as methoxypropionic acid (MOPA).

To test the use of glutaric acid as a cation regenerant in the processes of the invention, an aqueous solution of glutaric acid containing N, N-dimethyl-2-methoxyethylamine (DMMEA) equivalent to ~40% of the carboxylic acid was passed through an acidic silica gel chromatographic column. At first, free glutaric acid came through followed by glutaric acid functional groups associated with an ever-increasing amount of DMMEA. The final cut consisted of equivalent amounts of glutaric acid and DMMEA that could only result if both of the carboxylic acid functional groups on glutaric acid had substantially the same dissociation constants ($\sim 10^{-5}$). Other diacids such as succinic and diglycolic exhibit quite different dissociation constants between the two functional acid groups, generally >1.5 orders of magnitude. If glutaric acid possessed a difference in dissociation constants for its two acids, removal of amine by thermal dissociation and distillation would not be expected to go beyond about 50%. In actuality, 50% or more of the amine was removed by distillation. Passing the resulting solution through the acidic silica gel column gave >30% free glutaric acid, which would not be expected if the two acid groups had dissociation constants differing by at least one order of magnitude.

Another advantage of glutaric acid is that it is a very stable acid. It boils at 200° C. at 20 mm Hg. It is also a weaker acid than prior art regenerant acids such as MOPA. Glutaric acid has a solubility in excess of 2N in water, as does its sodium salt. Its calcium salt was found to have a solubility in water in excess of 0.9N, which is an unusually high solubility for the calcium salt of a dicarboxylic acid.

Testing showed that glutaric acid was able to remove sodium from the cation resin (IRC-86) with efficiency. With glutaric acid, calcium regeneration, which is more difficult than sodium regeneration, was still completed. However, to achieve total cation resin regeneration, over 50% more glutaric acid is required to remove calcium than is needed for sodium removal.

The next most important variable in cation resin regeneration at room temperature is the contact time between the acid and resin. The variable effect is non-linear. When the acid "superficial contact time" is less than sixty minutes, contact time becomes increasingly important. Further, less acid is required for complete regeneration as the resin loading with cation is reduced. Specifically, a 43.5% calcium loading required 50% less glutaric acid than 100% calcium loading. A 40% sodium loading required 20% less acid than a 100% loading at nearly equal contact time. The preferred superficial contact time for the regeneration of the cation resin with organic acid regenerant is about 60 to 120 min.

Organic Base Anion Regenerants

The preferred organic base anion regenerant used in the processes of the invention is N, N-dimethyl-2-methoxyethylamine (DMMEA). Ionac A-365 anion resin was loaded with either chloride or sulfate ions and regenerated using 2N concentration DMMEA. Of course, as with the cation resin, resin contact time will effect regeneration efficiency. The preferred superficial contact time for the regeneration of the anion resin with organic base regenerant is about 100 to about 600 min.

Monovalent chloride ions were removed completely from the anion resin with DMMEA more easily than divalent sulfate ions, which require about 50% more DMMEA for essentially complete regeneration. Testing showed that 100% chloride loaded anion resin (A-365) can be 100% regenerated with three bed volumes of 2N DMMEA (100% excess in equivalents) and water. In operation, it would be expected that about 60% or less of the anion resin capacity would be loaded with amine.

For both the cation and anion regeneration the following analytical procedures were utilized to evaluate the operating parameters. A 2 to 5 ml aliquot of regenerant feed solution was titrated using a Metrohm model E-436 Potentiograph and standardized titer solutions of about 1.00N HCl for the anion regenerant or NaOH for the cation regenerant to determine their concentrations and equivalent content. Regenerant solutions were made to 2.00N concentration levels.

For cation regenerant effluent, the amount of cation removed was determined by titrating a 4 to 10 ml aliquot of the collected regenerant effluent with HCl titer. The sample was then back-titrated with NaOH titer to measure the total acid content. The difference between the equivalents of acid added for regeneration and the equivalents of acid remaining after passing through the resin bed is the number of equivalents of cation removed from the resin.

For anion regeneration, a 4 to 10 ml aliquot of the anion regenerant effluent was titrated with the NaOH titer to determine the amine salt content, and the sample was then back-titrated with HCl to determine the total amine content. The difference between these values is free amine. To determine if complete regeneration was achieved, the amine regenerant and wash effluent was followed by a known quantity of ammonia (normally 20 to 50% of theoretical resin capacity). The column was then washed with deionized water until the pH was <8. The collected $NH_3$ regenerant effluent and wash were titrated, and the difference between the two values represented the amount of free acid. The total acid found in the effluent should equal the amount of acid regenerant fed into the column.

To determine if regeneration was 100% efficient, the organic acid regenerant and water wash effluent was followed by a strong acid regeneration (HCl) with a known equivalency of 20–50% of the theoretical resin capacity. When the pH of the effluent was greater than 5, a sample of effluent was titrated with NaOH. Any difference between the acid content of the effluent and acid content of the feed would indicate incomplete regeneration.

For preparation of DMMEA anion regenerant the following reaction scheme was used:

Sodium methoxide (10.5 moles) was dissolved in 1.5 liters of anhydrous methanol under anhydrous conditions. N,N-dimethyl-2-chloroethylamine (5.0 moles) was dissolved in 1.5 liters warm (50° C.) methanol. The sodium methoxide solution was transferred to a 5-liter, 3-necked, round-bottom flask fitted with a dropping funnel, thermometer, a reflux condenser, a mechanical stirrer and a heating mantle. The reflux condenser was also fitted with a drying tube. The sodium methoxide was stirred and heated to 60° C. At this point the chloroethylamine solution was slowly added to the reaction flask through the dropping funnel at a rate to keep the reaction solution at near the reflux temperature. No heating was required during the additional cycle.

Sufficient heat was generated by the reaction to maintain the reaction temperature at reflux. Addition took about 2 hours. After addition was complete, the reaction mixture was stirred and refluxed for 2 hours. The reaction mixture was then filtered to remove salt. The salt was washed with two 100 ml portions of warm (50° C.) methanol. The filtrate with washings was acidified with 5 moles of concentrated (30–35%) HCl solution to convert the product amine to the HCl salt. This solution was transferred to the 5-liter flask which was fitted with a distilling head, condenser and receiver. The methanol was removed from the reaction solution by distillation. After the methanol was removed, 5 moles of 50% caustic solution were slowly added to the reaction mixture to free the product amine, DMMEA. The DMMEA is separated from this solution by distillation. The cut which boiled from 85°–95° C. was collected. Yield was ~3.5 moles (~70% of theory). The by-product was a higher boiling amine, probably N,N-dimethylhydroxyethylamine. Preparation of dimethylhydroxyethylamine ethers is found in *J. Amer. Chem. Soc.* 74:1313–1315 (1952).

REGENERANT RECOVERY

In the preferred processes of the invention, regenerant acids and bases are recovered and recycled back to the regeneration steps. There are three key requirements for regenerant recovery in the processes of the invention. These requirements are: the removal of the mineral salts without loss of regenerants; the dissociation of the amine-acid salt formed when reconstituting the mineral salts which were originally removed from the treated feedstock fluid in the ion exchange; and the production of separate "clean" acid and base regenerants which are effective in regenerating the respective exhausted resin beds. "Clean" means that there will be no organic base regenerant compounds in the organic acid regenerant produced and no organic acid regenerant compounds in the organic base regenerant produced by the recovery system. Further, the amount of mineral salts present in the acid regenerant should be as low as possible, but certainly below about 5% of the acid content.

Since the organic base anion regenerant (amine) is recovered as an overhead distillation product, there is no difficulty in obtaining the purity necessary for re-use as an anion resin regenerant. The concern is only to make a sufficient separation from the water in the spent regenerant to obtain at least a 2N concentration of organic base regenerant.

In the case of the organic acid, because it is a "bottoms" product of an evaporation or distillation step, the separation from the salts, particularly organic base (amine) salts, is critical to obtaining a "clean" organic acid regenerant which is ready for recycle to the regenerant supply tank. The technique used to accomplish this step in the process of the invention may comprise the use of a silica bed for chromatographic separation of a significant portion of the acid (at least about 25%) as amine salt-free acid from the charge being treated. Three test runs indicated that about 30% of the free acid can be recovered, free of amine-salts, per pass through the chromatographic step. The remainder must be recycled as a constant "heel" in the recovery process.

As shown in FIG. 3, the regenerant recovery system of the invention has two input flows, the spent cation regenerant 18 and the spent anion regenerant 20; and three output flows, the recovered organic acid regenerant (cation resin regenerant), the recovered organic base regenerant (anion resin regenerant), and neutral inorganic salts reclaimed from the fluid that is deionized/demineralized by the ion exchange resins.

First, the spent anion regenerant solution which contains free organic base regenerant and organic base anion salts of the organic base regenerant (such as DMMEA-HCl) is distilled to remove the free organic base. The "overhead" product is free organic base such as 2N DMMEA, ready for reuse as the anion resin regenerant. The "bottoms" product will contain only traces of free organic base, organic base anion salts, and water. This "bottoms" stream is combined with the spent cation regenerant and fed to an evaporator which removes excess water accumulated from resin regeneration water washes and concentrates the organic acid, organic acid/organic base complex, and neutral inorganic salts in the combined stream to near saturation concentration. Next, this concentrate is cooled and fed to a precipitation vessel, where with the addition of an alcohol, such as methanol, ethanol or isopropanol, the neutral inorganic salts are precipitated. The resulting slurry is filtered and the precipitate washed with alcohol to remove the occluded organic acid and organic base. Some of the water, previously evaporated, is used to make a concentrated salt solution to wash residual alcohol from the precipitate. This filtrate is added to the alcohol-rich solution, and the solution is then distilled to remove and recover the alcohol for continued use in the mineral salt precipitation. The "bottoms" from this distillation is charged to a silica column to obtain a cut of "clean" organic acid such as glutaric acid which can be immediately used for the next cation resin column regeneration. The "tail" cut from the silica column and the washings are distilled in a dissociation/distillation column where organic acid/organic base complex is partially dissociated to yield distilled water and organic base. The overhead dilute organic base is returned to the spent organic base distillation step for recovery, and the "bottoms" solution, rich in organic acid and non-dissociated organic acid/organic base complex, is recycled as the "heel" to the evaporation step. The described flows are shown in FIG. 3.

Since the demineralization and regenerant recovery steps of the processes of this invention are separable, those skilled in the art will recognize that the deionization/demineralization steps can be used as a stand-alone process without regenerant recovery. Since the weak acid/weak base resins of this invention can be quantitatively regenerated with about 5 to 10% stoichiometric excesses of mineral acids and bases such as HCl for the cation resin and NaOH for the anion resin, the deionization and demineralization processes of the invention would offer advantages over using strong acid/strong base resins for deionization/demineralization because the latter resins require 2–3 times stoichiometric excess to achieve quantitative resin regeneration. Therefore, the deionization/demineralization steps of the invention may be used economically without regenerant recovery where disposal of brine to a waste site is permitted and economical. However, environmental considerations weigh in favor of the regenerant recovery and recycle steps of the preferred embodiments of the invention.

The following example illustrates a preferred embodiment of the invention.

EXAMPLE

Five sets of vertically mounted cation resin/anion resin pairs were prepared. Each pair comprised two vertically mounted 450 mm long ion exchange columns with 37 mm inside diameters. The columns with end fittings were supplied by Andrews Glass Company, Vineland, N.J.

The first column in each pair was loaded with approximately 226 cc of "as received" Amberlite IRC-86 weakly acidic cation exchange resin, Rohm & Haas Company, Philadelphia, Pa. The second column in each pair was loaded with approximately 423 cc of "as received" Purolite A-830 weakly basic anion exchange resin, The Purolite Company, Bala Cynwyd, Pa. When tested, the Purolite A-830 resin was found to have an active site density (measured capacity) of about 3.3 meq/ml, although the manufacturer's specifications indicate that A-830 has a minimum active site density of 2.7 meq./ml.

The IRC-86 cation resin beds were conditioned by loading the resin beds with a feed of 1N sodium hydroxide solution, followed by a deionized water wash. This was followed by a regeneration of the cation resin beds with 1N HCl, followed by another deionized water wash to an effluent pH of >5. Three conditioning cycles (loading and regeneration) were used for each cation resin bed.

The A-830 resin beds were conditioned by loading the resin beds with a feed of 1N HCl, followed by a deionized water wash. This was followed by a regeneration of the anion resin beds with 1N ammonia, followed by another deionized water wash to an effluent pH of <8. Three conditioning cycles were also used for each anion resin bed.

The loading test feed rates (top-down) targets were either 5 or 11 cc/min.; the regeneration and water wash rates, also topdown, were 6 cc/min. The feed pumps used were Masterflex variable speed peristaltic, model 7520-10 with 7518-10 quick change pump head.

Next, a tris(hydroxymethyl)aminomethane ("Tris") buffer (0.05M) was fed to the first IRC-86 cation resin column at a superficial contact time of about 23 min. The IRC-86 was buffer loaded to a level of approximately 2.7 meq/ml (65% of theoretical capacity) without significant buffer bleed. We have found that the maximum buffer loading appears to be about 72% of theoretical capacity.

A sodium chloride feed (0.05N, 2925 ppm) was then loaded onto the first IRC-86 cation resin column buffered with Tris at a superficial contact time of about 19 min. About 67% of the cation resin capacity was loaded with sodium ions when the cation resin was buffered with Tris to 72% of measured resin capacity. More significantly, NaCl was split quantitatively, loading all the $Na^+$ ions by displacing buffer up to 50% of the theoretical resin capacity before any NaCl "breakthrough" was observed. This test indicated that about three column sets may be the preferred minimum for production of good quality deionized water, with a fourth set in the regeneration cycle.

The effluent anion-buffer complex (Tris.HCl) from the cation resin then flowed into the A-830 anion resin where the Cl-anion of the anion-buffer complex was loaded onto the A-830 resin. The Tris.HCl was loaded at 1.02 cc/(sq cm-min) representing a superficial contact time of about 45 min. The results of Tris.HCl splitting on the A-830 resin indicate that between about 32 to 37% resin capacity was utilized before significant Tris.HCl appeared in the product stream. (For a 2.24 cc/(sq cm-min) flux rate, between about 29 to 33% resin capacity was used before significant Tris.HCl appeared in the product stream.) Both sets of data again indicate that about three column sets are preferred in the processes of the invention during the service cycle, with a fourth set in the regeneration cycle.

After the first cation (IRC-86) and anion (A-830) resins were exhausted, they were removed for regeneration to the end of the line of resin pairs, and the second set of cation and anion resins were rotated to the "first" position where the free hydrated Tris buffer from the first anion resin effluent had loaded onto the second cation resin, and the process described above began anew and was repeated through the remaining four resin pairs. After five service cycles, the effluent product water contained less than about 10 ppm total dissolved solids.

Each spent cation/anion resin pair beginning with the first pair was regenerated as follows. The cation and anion resins were each washed with one bed volume of deionized water. Next 2.0N glutaric acid was fed, top-down at 17 cc/min. at a flux of about 1.6 cc/sq/cm-min., representing a superficial contact time of about 62 min. through the first spent cation resin. 2.0N N, N-dimethyl-2-methoxyethylamine (DMMEA), was fed, top-down at 3 cc/min. at a flux of about 0.3 cc/sq cm-min., representing a superficial contact time of about 450 min. through the first spent anion resin.

The spent anion regenerant solution comprising free DMMEA and DMMEA-HCl was distilled at a temperature of 85°–95° C. to remove free DMMEA. The recovered 2N DMMEA "overhead" product was recycled to the regenerant system for use as anion regenerant. The "bottoms" product containing only traces of free DMMEA, about a 1N concentration of DMMEA-HCl, and water was combined with the spent cation regenerant in an evaporator as follows.

The spent cation regenerant solution comprising sodium glutarate and free glutaric acid was combined with the "bottoms" product of the DMMEA regenerant comprising trace free DMMEA, about a 1N concentration of DMMEA-HCl and water and fed to an evaporator at a temperature of 110° C. The evaporator removed excess water accumulated from resin regeneration water washes and concentrated the glutaric acid and DMMEA-glutarate salts formed in the combined stream near saturation concentration.

The concentrate was next cooled to about 20°–25° C. and fed to a precipitation vessel, where five volumes of isopropanol per unit volume of aqueous solution were added to precipitate NaCl. The resulting slurry was filtered and washed with 50 ml of isopropanol to remove the occluded glutaric acid and DMMEA from the NaCl.

The precipitate was then washed with 50 ml of salt saturated water (3% NaCl) to remove residual isopropanol from the precipitate. The filtrate was then returned to the isopropanol-rich solution and was distilled at 87°–88° C. removing and recovering isopropanol which was recycled to the salt precipitation step. The "bottoms" from this distillation was charged to a silica column (Silica Gel, grade 12, mesh 28–200, Aldrich Chemical Company, Milwaukee, Wis.) and a "fore" cut of "clean" glutaric acid was recovered and recycled for the next cation resin regeneration.

The "tail" cut from the silica column and the water washings that followed were distilled removing water and DMMEA, formed as the DMMEA-glutarate salt was partially dissociated. The "overhead" dilute DMMEA was recycled to the initial spent anion regenerant distillation step for recovery, and the "bottoms" solution, rich in glutaric acid and non-dissociated DMMEA-glutarate, was recycled as the "heel" to the evaporation step.

The embodiments of the invention disclosed herein have been discussed for the purpose of familiarizing the reader with novel aspects of the invention. Although preferred embodiments of the invention have been shown and described, many changes, modifications, and substitutions may be made by one having skill in the art without necessarily departing from the spirit and scope of the invention.

We claim:

1. A process for deionization and demineralization of a fluid containing ions comprising:
    (a) Loading an amine or ammonia buffer onto a first weakly acidic cation exchange resin to occupy cation exchange sites and to form a first bed comprising a first amine-buffered resin;
    (b) Passing said fluid containing ions through said first bed comprising said first amine-buffered resin and exchanging cations of said fluid for amine cations of said first amine-buffered resin to form a first effluent comprising an anion-buffer salt complex;
    (c) Passing said anion-buffer salt complex through a first weakly basic anion exchange resin comprising an aliphatic polyamine ion exchange resin having an active site density of at least about 2.5 meq/ml (water swollen bead form), where an anion portion of said anion-buffer salt complex is split from said anion-buffer salt complex by adsorption of said anion portion onto said weakly basic anion exchange resin to form a second effluent comprising buffer in free hydrated base form;
    (d) Passing said buffer in free hydrated base form to a second weakly acidic cation exchange resin where said buffer loads onto said second weakly acidic cation exchange resin as in step (a) and repeating the process of steps (b)–(d);
    (e) Regenerating said first weakly acidic cation exchange resin with an acid to reestablish said first weakly acidic cation exchange resin to hydrogen form; and
    (f) Regenerating said first weakly basic anion exchange resin with a base to reestablish said first weakly basic anion exchange resin to free hydrated base form.

2. The process of claim 1 wherein said weakly basic anion exchange resin comprises an acrylic matrix.

3. The process of claim 1 wherein said amine or ammonia buffer comprises a polyhydroxyethylamine.

4. The process of claim 3 wherein said polyhydroxyethylamine comprises tris (hydroxymethyl) aminomethane ("Tris").

5. A process for deionization and demineralization of a fluid containing ions comprising:
    (a) Loading an amine or ammonia buffer comprising a hydroxylamine of the formula $HONH_2$ or R—NH—OH, where R is selected from —$CH_3$, —$CH_2CH_3$, —$CH_2CH_2CH_3$, —$CH_2CH_2OH$ and —$CH_2CH(OH)CH_2OH$, onto a first weakly acidic cation exchange resin to occupy cation exchange sites and to form a first bed comprising a first amine-buffered resin;
    (b) Passing said fluid containing ions through said first bed comprising said first amine-buffered resin and exchanging cations of said fluid for amine cations of said first amine-buffered resin to form a first effluent comprising an anion-buffer salt complex;
    (c) Passing said anion-buffer salt complex through a first weakly basic anion exchange resin where an anion portion of said anion-buffer salt complex is split from said anion-buffer salt complex by adsorption of said anion portion onto said weakly basic anion exchange resin to form a second effluent comprising buffer in free hydrated base form;
    (d) Passing said buffer in free hydrated base form to a second weakly acidic cation exchange resin where said buffer loads onto said second weakly acidic cation exchange resin as in step (a) and repeating the process of steps (b)–(d);
    (e) Regenerating said first weakly acidic cation exchange resin with an acid to reestablish said first weakly acidic cation exchange resin to hydrogen form; and
    (f) Regenerating said first weakly basic anion exchange resin with a base to reestablish said first weakly basic anion exchange resin to free hydrated base form.

6. The process of claim 5 wherein said weakly basic anion exchange resin comprises an aliphatic polyamine ion exchange resin having an active site density of at least about 2.5 meq/ml (water swollen bead form).

7. The process of claim 5 wherein said buffer further comprises tris (hydroxymethyl) aminomethane ("Tris").

8. The process of claim 7 wherein said hydroxylamine and said Tris comprise an approximately 50:50 mixture.

9. A process for deionization and demineralization of a fluid containing ions comprising:

(a) Loading an amine or ammonia buffer comprising tris(hydroxymethyl)aminomethane ("Tris") onto a first weakly acidic cation exchange resin to occupy cation exchange sites and to form a first bed comprising a first amine-buffered resin;

(b) Passing said fluid containing ions through said first bed comprising said first amine-buffered resin and exchanging cations of said fluid for amine cations of said first amine-buffered resin to form a first effluent comprising an anion-buffer salt complex;

(c) Passing said anion-buffer salt complex through a first weakly basic anion exchange resin comprising an aliphatic polyamine ion exchange resin having an active site density of at least about 2.5 meq/ml (water swollen bead form), where an anion portion of said anion-buffer salt complex is split from said anion-buffer salt complex by adsorption of said anion portion onto said weakly basic anion exchange resin to form a second effluent comprising buffer in free hydrated base form;

(d) Passing said buffer in free hydrated base form to a second weakly acidic cation exchange resin where said buffer loads onto said second weakly acidic cation exchange resin as in step (a) and repeating the process of steps (b)–(d);

(e) Regenerating said first weakly acidic cation exchange resin with an organic acid to reestablish said first weakly acidic cation exchange resin to hydrogen form and to form a spent organic acid regenerant comprising a mixture of cation salts of the organic acid regenerant and free organic acid regenerant; and (f) Regenerating said first weakly basic anion exchange resin with an organic base to reestablish said first weakly basic anion exchange resin to free hydrated base form and to form a spent organic base regenerant comprising a mixture of anion salts of said organic base regenerant and free organic base regenerant.

10. The process of claim 9 wherein said organic acid comprises glutaric acid or a glutaric acid derivative.

11. The process of claim 9 wherein said organic base comprises N, N-dimethyl-2-methoxyethylamine (DMMEA).

* * * * *